United States Patent
Grawrock et al.

(10) Patent No.: US 7,058,807 B2
(45) Date of Patent: Jun. 6, 2006

(54) VALIDATION OF INCLUSION OF A PLATFORM WITHIN A DATA CENTER

(75) Inventors: David W. Grawrock, Aloha, OR (US); James A. Sutton, II, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 931 days.

(21) Appl. No.: 10/122,785

(22) Filed: Apr. 15, 2002

(65) Prior Publication Data

US 2003/0196083 A1    Oct. 16, 2003

(51) Int. Cl.
*H04L 9/00* (2006.01)
(52) U.S. Cl. .................................... 713/172
(58) Field of Classification Search ............... 713/172
See application file for complete search history.

(56) References Cited

U.S. PATENT DOCUMENTS

| | | |
|---|---|---|
| 3,699,532 A | 10/1972 | Schaffer et al. |
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. |
| 4,276,594 A | 6/1981 | Morley |
| 4,278,837 A | 7/1981 | Best |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen et al. |
| 4,521,852 A | 6/1985 | Guttag |
| 4,571,672 A | 2/1986 | Hatada et al. |
| 4,759,064 A | 7/1988 | Chaum |
| 4,795,893 A | 1/1989 | Ugon |
| 4,802,084 A | 1/1989 | Ikegaya et al. |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |

(Continued)

FOREIGN PATENT DOCUMENTS

DE    4217444    12/1992

(Continued)

OTHER PUBLICATIONS

Heinrich, J., "MIPS R4000 Microprocessor User's Manual," 1994, MIPS Technology, Inc., Mountain View, CA, pp. 67-79.

(Continued)

*Primary Examiner*—Matthew Smithers
(74) *Attorney, Agent, or Firm*—Blakely, Sokoloff, Taylor & Zafman LLP

(57) ABSTRACT

In one embodiment, a method comprises generating a cryptographic key pair associated with a data center. The method also includes storing a private key of the cryptographic key pair within a platform. The private key is used to sign a value stored in the platform for validation of inclusion of the platform into the data center. In an embodiment, the private key is revoked upon determining that the platform has been compromised. In one embodiment, the private key may be revoked in each of the platforms of the data center.

53 Claims, 10 Drawing Sheets

U.S. PATENT DOCUMENTS

| | | |
|---|---|---|
| 5,079,737 A | 1/1992 | Hackbarth |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Holtey et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,437,033 A | 7/1995 | Inoue et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubals |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle et al. |
| 5,796,845 A | 8/1998 | Serikawa et al. |
| 5,805,712 A | 9/1998 | Davis |
| 5,809,546 A | 9/1998 | Greenstein et al. |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,872,994 A | 2/1999 | Akiyama et al. |
| 5,890,189 A | 3/1999 | Nozue et al. |
| 5,901,225 A | 5/1999 | Ireton et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,953,502 A | 9/1999 | Helbig, Sr. |
| 5,956,408 A | 9/1999 | Arnold |
| 5,970,147 A | 10/1999 | Davis |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo et al. |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Insley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,249,872 B1 | 6/2001 | Wildgrube et al. |
| 6,252,650 B1 | 6/2001 | Nakamura |
| 6,269,392 B1 | 7/2001 | Cotichini et al. |
| 6,272,533 B1 | 8/2001 | Browne |
| 6,272,637 B1 | 8/2001 | Little et al. |
| 6,275,933 B1 | 8/2001 | Fine et al. |
| 6,282,650 B1 | 8/2001 | Derek |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,314,409 B1 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng et al. |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. |
| 6,378,068 B1 | 4/2002 | Foster |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,412,035 B1 | 6/2002 | Webber |
| 6,421,702 B1 | 7/2002 | Gulick |
| 6,445,797 B1 | 9/2002 | McGough et al. |
| 6,463,535 B1 | 10/2002 | Drews et al. |
| 6,463,537 B1 | 10/2002 | Tello |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B1 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 2001/0021969 A1 | 9/2001 | Burger et al. |

| | | | |
|---|---|---|---|
| 2001/0027511 | A1 | 10/2001 | Wakabayashi et al. |
| 2001/0027527 | A1 | 10/2001 | Khidekel et al. |
| 2001/0037450 | A1 | 11/2001 | Metlitski et al. |
| 2002/0007456 | A1 | 1/2002 | Peinado et al. |
| 2002/0023032 | A1 | 2/2002 | Pearson et al. |
| 2002/0147916 | A1 | 10/2002 | Strongin et al. |
| 2002/0166061 | A1 | 11/2002 | Falik et al. |
| 2002/0169717 | A1 | 11/2002 | Challener |
| 2003/0018892 | A1 | 1/2003 | Tello |
| 2003/0074548 | A1 | 4/2003 | Cromer et al. |
| 2003/0115453 | A1 | 6/2003 | Grawrock |
| 2003/0126442 | A1 | 7/2003 | Glew et al. |
| 2003/0126453 | A1 | 7/2003 | Glew et al. |
| 2003/0159056 | A1 | 8/2003 | Cromer et al. |
| 2003/0188179 | A1 | 10/2003 | Challener et al. |
| 2003/0196085 | A1 | 10/2003 | Lampson et al. |
| 2005/0138384 | A1* | 6/2005 | Brickell et al. ............. 713/182 |
| 2005/0216736 | A1* | 9/2005 | Smith ........................ 713/168 |
| 2005/0251857 | A1* | 11/2005 | Schunter et al. ............. 726/16 |

FOREIGN PATENT DOCUMENTS

| | | |
|---|---|---|
| EP | 0473913 | 3/1992 |
| EP | 0600112 A1 | 8/1994 |
| EP | 0892521 | 1/1999 |
| EP | 0961193 | 12/1999 |
| EP | 0965902 | 12/1999 |
| EP | 1 030 237 A1 | 8/2000 |
| EP | 1055989 | 11/2000 |
| EP | 1056014 | 11/2000 |
| EP | 1085396 | 3/2001 |
| EP | 1146715 A1 | 10/2001 |
| EP | 1271277 | 1/2003 |
| WO | WO9524696 | 9/1995 |
| WO | WO 97/29567 | 8/1997 |
| WO | WO9812620 | 3/1998 |
| WO | WO 98/34365 | 8/1998 |
| WO | WO 98/44402 | 10/1998 |
| WO | WO 99/05600 | 2/1999 |
| WO | WO 99/09482 | 2/1999 |
| WO | WO9918511 | 4/1999 |
| WO | 0930567 A3 | 7/1999 |
| WO | WO 99/57863 | 11/1999 |
| WO | WO99/65579 | 12/1999 |
| WO | WO0201794 | 1/2000 |
| WO | 02000076139 A | 3/2000 |
| WO | WO0021238 | 4/2000 |
| WO | WO0163994 | 4/2000 |
| WO | WO 00/62232 | 10/2000 |
| WO | WO 01/27723 A | 4/2001 |
| WO | WO 01/27821 A | 4/2001 |
| WO | WO 01 75564 A | 10/2001 |
| WO | WO 01/75565 | 10/2001 |
| WO | WO 01/75595 | 10/2001 |
| WO | WO 02 17555 A | 2/2002 |
| WO | WO02060121 | 8/2002 |
| WO | WO 02 086684 A | 10/2002 |
| WO | WO03058412 | 7/2003 |

OTHER PUBLICATIONS

Heinrich, J. "MIPS R4000 Microprocessor User's Manual," Apr. 1, 1993, MIPS, Mt. View, XP002184449, pp. 61-97.

"M68040 User's Manual," 1993, Motorola, Inc., Chapters 1-8, including, pp. 1-5, 1-9, 1-13, 1-20, 2-1, 2-3, 4-1, 8-9 and 8-11.

"Intel 386 DX Microprocessor 32-BIT CHMOS Microprocessor with Integrated Memory Management," Dec. 31, 1995, Intel, Inc., pp. 1-56, including pp. 32-58; and figure 4-14.

Berg, C., "How Do I Create a Signed Applet?," Dr. Dobb's Journal, M&T Publ., Redwood City, CA, US, vol. 22, No. 8, Aug. 1997, pp. 1-9.

Gong, L., et al., "Going Beyond the Sandbox: An Overview of the New Security Architecture in the Java Development Kit 1.2," Proceedings of the Usenix Symposium on the Internet Technologies and Systems, Monterrey, CA Dec. 1997, pp. 103-112.

Goldberg, R., "Survey of virtual machine research," IEEE Computer Magazine 7(6), pp. 34-45, 1974.

Gum, P.H., "System/370 Extended Architecture: Facilities for Virtual Machines," IBM J. Research Development, vol. 27, No. 6, pp. 530-544, Nov. 1983.

Rosenblum, M. "Vmware's Virtual Platform: A Virtual Machine Monitor for Commodity PCs," Proceedings of the 11th Hotchips Conference, pp. 185-196, Aug. 1999.

Lawton, K., "Running Multiple Operating Systems Concurrently on an IA32 PC Using Virtualization Techniques," http://www.plex86.org/research/paper.txt; Aug. 9, 2001; pp. 1-31.

"Trust Computing Platform Alliance (TCPA)," Main Specification Version 1.1a, Compaq Computer Corporation, Hewlett-Packard Company, IBM Corporation, Intel Corporation, Microsoft Corporation, Dec. 2001.

"Information Display Technique for a Terminate Stay Resident Program," IBM Technical Disclosure Bulletin, TDB-ACC-No. NA9112156, Dec. 1, 1991, pp. 156-158, vol. 34, Issue No. 7A.

Robin, John Scott and Irvine, Cynthia E., "Analysis of the Pentium's Ability to Support a Secure Virtual Machine Monitor," Proceedings of the 9th USENIX Security Symposium, Aug. 14, 2000, pp. 1-17, XP002247347, Denver, CO.

Karger, Paul A., et al., "A VMM Security Kernel for the VAX Architecture," Proceedings of the Symposium on Research in Security and Privacy, May 7, 1990, pp. 2-19, XP010020182, ISBN: 0-8186-2060-9, Boxborough, MA.

Chien, Andrew A., et al., "Safe and Protected Execution for the Morph/AMRM Reconfigurable Processor," 7th Annual IEEE Symposium, FCCM '99 Proceedings Apr. 21, 1999, pp. 209-221, XP010359180, ISBN: 0-7695-0375-6, Los Alamitos, CA.

Brands, Stefan, "Restrictive Blinding of Secret-Key Certificates", Springer-Verlag XP002201306, (1995), Chapter 3.

Davida, George I., et al., "Defending Systems Against Viruses through Cryptographic Authentication", *Proceedings of the Symposium on Security and Privacy*, IEEE Comp. Soc. Press, ISBN 0-8186-1939-2, (May 1989).

Kashiwagi, Kazuhiko, et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Luke, Jahn, et al., "Replacement Strategy for Aging Avionics Computers", *IEEE AES Systems Magazine*, XP002190614, (Mar. 1999).

Menezes, Oorschot, "Handbook of Applied Cryptography", *CRC Press LLC, USA XP002201307*, (1997),475.

Richt, Stefan, et al., "In-Circuit-Emulator Wird Echtzeittauglich", *Elektronic, Franzis Verlag GMBH, Munchen, DE*, vol. 40, No. 16, XP000259620,(100-103),Aug. 6, 1991.

Saez, Sergio, et al., "A Hardware Scheduler for Complex Real-Time Systems", *Proceedings of the IEEE International Symposium on Industrial Electronics*, XP002190615,(Jul. 1999),43-48.

Sherwood, Timothy, et al., "Patchable Instruction ROM Architecture", *Department of Computer Science and Engi-*

*neering, University of California, San Diego, La Jolla, CA*, (Nov. 2001).

Coulouris, George, et al., "Distributed Systems, Concepts and Designs", *2nd Edition*, (1994),422-424.

Crawford, John , "Architecture of the Intel 80386", *Proceedings of the IEEE International Conference on Computer Design: VLSI in Computers and Processors (ICCD '86)*, (Oct. 6, 1986), 155-160.

Fabry, R.S. , "Capability-Based Addressing", *Fabry, R.S., "Capability-Based Addressing," Communications of the ACM*, vol. 17, No. 7, (Jul. 1974),403-412.

Frieder, Gideon, "The Architecture And Operational Characteristics of the VMX Host Machine", *The Architecture And Operational Characteristics of the VMX Host Machine, IEEE*, (1982),9-16.

Intel Corporation, "IA-64 System Abstraction Layer Specification", *Intel Product Specification*, Order No. 245359-001, (Jan. 2000), 1-112.

Intel Corporation, "Intel 82802AB/82802AC Firmware Hub (FWH)", *Intel Product Datasheet*, Document No. 290658-004,(Nov. 2000), 1-6, 17-28.

Intel Corporation, "Intel IA-64 Architecture Software Developer's Manual", vol. 2:IA-64 *System Architecture*, Order No. 245318-001, (Jan. 2000),i, ii, 5.1-5.3, 11.1-11.8, 11.23-11.26.

Menezes, Alfred J., et al., "Handbook of Applied Cryptography", *CRC Press Series on Discrete Mathematics and its Applications*, Boca Raton, FL, XP002165287, ISBN 0849385237,(Oct. 1996),403-405, 506-515, 570.

Nanba, S. , et al., "VM/4: ACOS-4 Virtual Machine Architecture", *VM/4: ACOS-4 Virtual Machine Architecture, IEEE*, (1985), 171-178.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Schneier, Bruce , "Applied Cryptography: Protocols, Algorithm, and Source Code in C", Wiley, John & Sons, Inc., XP002939871; ISBN 0471117099,(Oct. 1995),47-52.

Schneier, Bruce , "Applied Cryptography: Protocols, Algorithm, and Source Code in C", Wiley, John & Sons, Inc., XP002138607; ISBN 0471117099,(Oct. 1995),56-65.

Scheier, Bruce , "Applied Cryptography: Protocols, Algorithms, and Source Code C", Wiley, John & Sons, Inc., XP0021111449; ISBN 0471117099,(Oct. 1995),169-187.

Schneier, Bruce , "Applied Cryptography: Protocols, Algorithms, and Source Code in C", *2nd Edition*; Wiley, John & Sons, Inc., XP002251738; ISBN 0471128457,(Nov. 1995),28-33; 176-177; 216-217; 461-473; 518-522.

\* cited by examiner

VALIDATION OF INCLUSION OF A PLATFORM WITHIN A DATA CENTER

BACKGROUND

Communication networks and the number of users exchanging and transferring data across such networks continue to increase. Specifically, with the advent of the Internet, e-business transactions have caused the exchange and/or transfer of users' personal and/or financial information. Currently, there are little assurances that a user and/or a business attempting to consummate an e-business transaction with a given web site is communicating with the server(s) associated with this web site. In particular, Internet Protocol (IP) snooping is becoming more rampant such that a given computer platform can pretend to be associated with a web site, thereby deceiving users (attempting to perform an e-business transaction with this web site) into disclosing personal and/or financial information.

In order to increase the security and trust associated with communications to a given computer platform/server, the Trusted Computing Platform Alliance (TCPA) has been formed. The TPCA describe in the TCPA Main Specification, Version 1.1a, 1 Dec. 2001 a Trusted Platform Module (TPM) or physical token that provides increased confidence and that enables enhancements of existing services and new services. The TPM supports auditing and logging of software processes, platform boot integrity, file integrity, and software licensing. The TPM provides a protected information store for the platform that can be used to attest to the identity of the platform as defined by the hardware that is present (e.g. processors, chipsets, firmware, etc.). These features encourage third parties to grant the platform access to information that would otherwise be denied.

While providing a level of relief for these security and trust issues for a given computer platform, the standards introduced by TCPA are limited to their applications. In particular, because of the increase in the number of users of the Internet, a given web site is required to include a number of computer platforms/servers to handle the load demands for an individual web site, thereby complicating the ability to provide secured communications due to the dynamic selection of these platforms/servers during such communications.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements.

DETAILED DESCRIPTION

The following description describes methods and apparatus for validation of inclusion of a platform within a data center. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

FIGS. 1–4 show block diagrams of systems for validating inclusion of a platform within a data center, in accordance with embodiments of the invention. FIGS. 5–9 show flow diagrams illustrating operations for validating inclusion of a platform within a data center, according to embodiments of the invention. The operations of the flow diagrams will be described with references to the systems shown in the block diagrams. However, it should be understood that the operations of the flow diagrams could be performed by embodiments of systems other than those discussed with reference to the block diagrams, and embodiments discussed with reference to the systems could perform operations different than those discussed with reference to the flow diagrams.

Figure 1A:
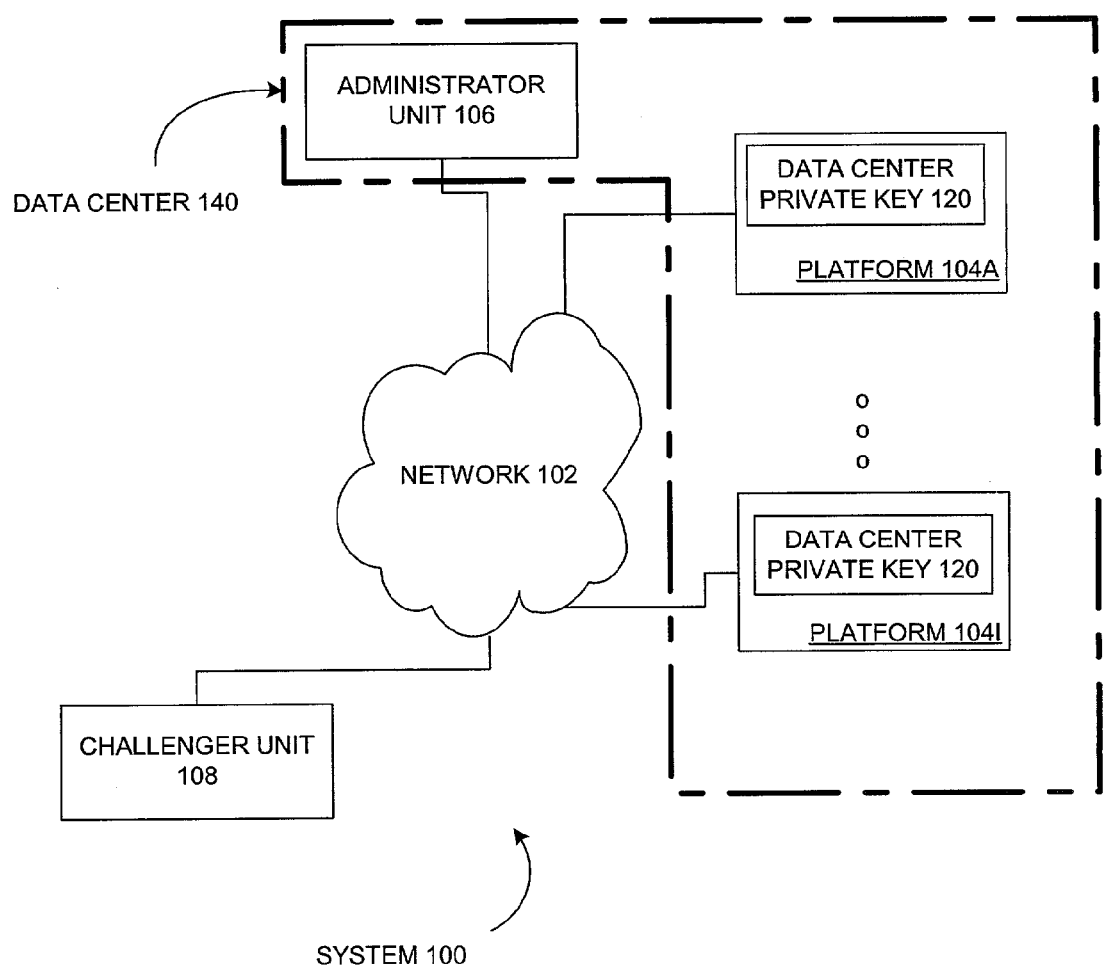
FIGS. 1A–1B illustrate systems for validation of a platform within a data center, according to embodiments of the invention.
Figure 1B:
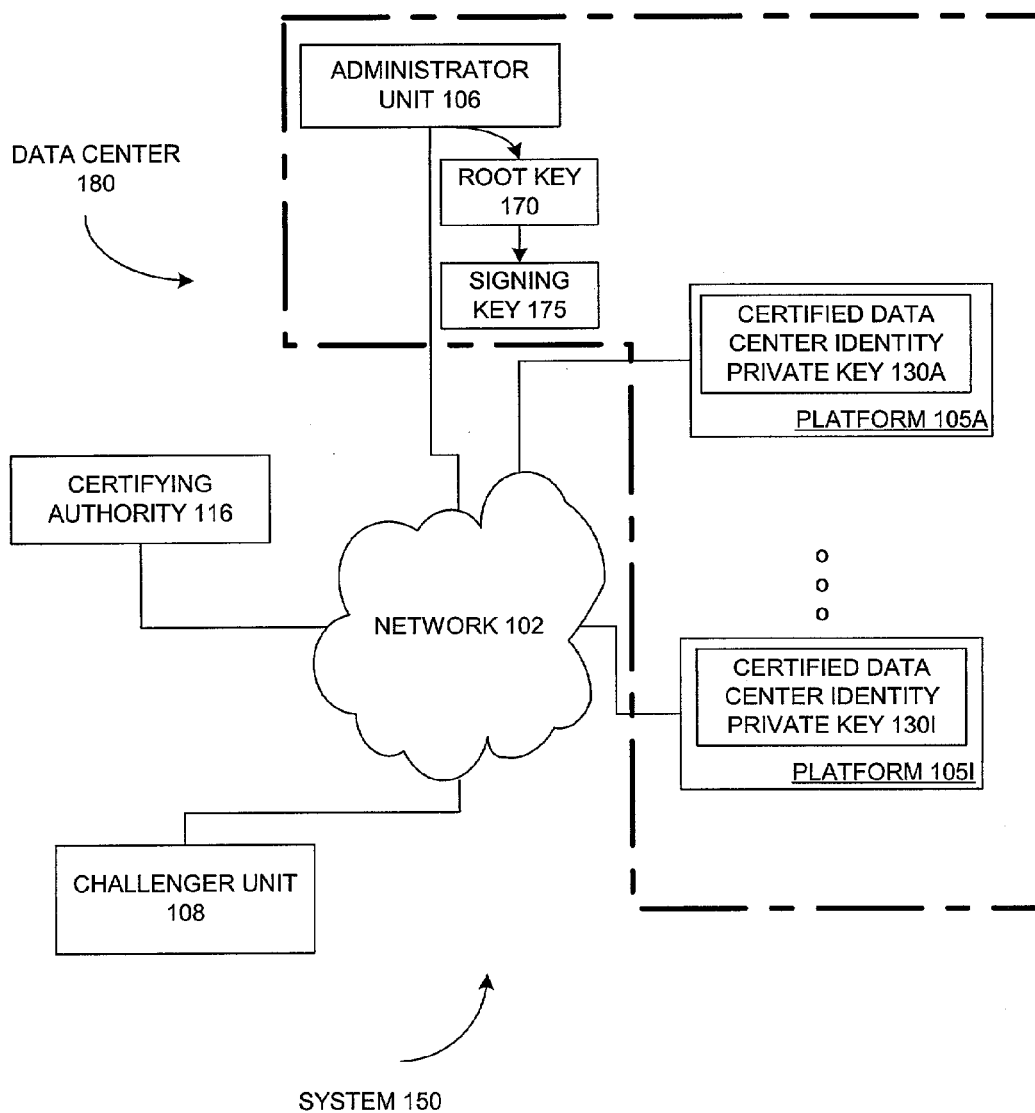

FIGS. 1A–1B illustrate systems for validation of a platform within a data center, according to embodiments of the invention. With regard to FIG. 1A, a system 100 comprises a challenger unit 108, a network 102 and a data center 140. The data center 140 may comprise an administrator unit 106 and platforms 104A–104I (i.e., one to a number of platforms therein).

In one embodiment, the platforms 104A–104I are associated with a same entity within a network. For example, the platforms 104A–104I may be servers associated with a given web site. Such a web site may be associated with a seller and distributor of a product (such as books, computer products, products for on-line auctioning, etc.), wherein the number of consumers of this web site are so great that a number of servers are needed to handle the load of requests from these consumers. Moreover, different platforms within the data center 140 may provide for different functionality. For example, a first set of platforms 104 may include application servers, while a second set of platforms 104 may include database servers for a same web site.

As will be described in more detail below, the platforms 104A–104I may store a data center private key 120 that is part of a cryptographic key pair. Additionally, a given data center private key 120 may be part of a cryptographic key pair based on a number of cryptographic algorithms. In one embodiment, the cryptographic key pair may be an asymmetric cryptographic key pair, such as those that are based on Rivest-Shamir-Adleman (RSA) cryptographic algorithms. In one embodiment, the data center private key 120 is a same private key that is stored across the different platforms 104A–104I. The administrator unit 106 may generate this cryptographic key pair, wherein the data center private key 120 is stored in the platforms 104A–104I, while the associated public key in this cryptographic key pair may be distributed to the challenger unit 108, for challenges of the inclusion of a platform within the data center 140 (as will be described in more detail below).

The challenger unit 108 and the components of the data center 140 may be coupled together through the network 102. In one embodiment, the network 102 may be a local area network (LAN). In an embodiment, the network 102 may be a wide area network (WAN). Further, the network 102 may be a combination of different networks that couple the challenger unit 108 and the components of the data center 140. In one embodiment, virtual private networks (VPNs) may be employed in the communications among the units of data center 140 and the challenger unit 108.

With regard to FIG. 11B, a system 150 comprises the challenger unit 108, a certifying authority 116, the network 102 and a data center 180. The challenger unit 108, the certifying authority 116 and the components of the data center 180 may be coupled together through the network 102. The data center 180 may comprise an administrator unit 106 and platforms 105A–105I (i.e., one to a number of platforms therein).

As will be described in more detail below, the platforms 105A–105I may store certified data center identity private keys 130A–130I. In one embodiment, the platforms 105A–105I store different certified data center identity private keys 130A–130I. For example, as shown, platform 105A stores certified data center identity private key 130A, while platform 105I stores certified data center identity private key 130I. Additionally, a given certified data center identity private key 130A–130I may be part of a cryptographic key pair based on a number of cryptographic algorithms. In one embodiment, the cryptographic key pair may be asymmetric cryptographic key pairs, such as those that are based on RSA cryptographic algorithms.

In one embodiment, this cryptographic key pair may be generated by the platform 105. The administrator unit 106 may generate a root key 170 that is signed by the certifying authority 116, thereby generating a signing key 175. The signing key 175 may be employed to certify the different certified data center identity keys 130A–130I stored in the platforms 105A–150I.

While the system 100 and the system 150 are illustrated such that the challenger unit 108 is external to the data center 140 and the data center 180, respectively, embodiments of the invention are not so limited. For example, the administrator unit 106 and the challenger unit 108 could be part of a same unit. In another embodiment, the challenger unit 108 is internal to the data centers 140 and 180, but independent of the administrator unit 106. With regard to the system 150, in an embodiment, the certifying authority 116 may be a part of the administrator unit 106. In another embodiment, the certifying authority 116 is part of the data center 180 but independent of administrator unit 106. The operations of the system 100 and the system 150 will be described in more detail below.

Figure 2:
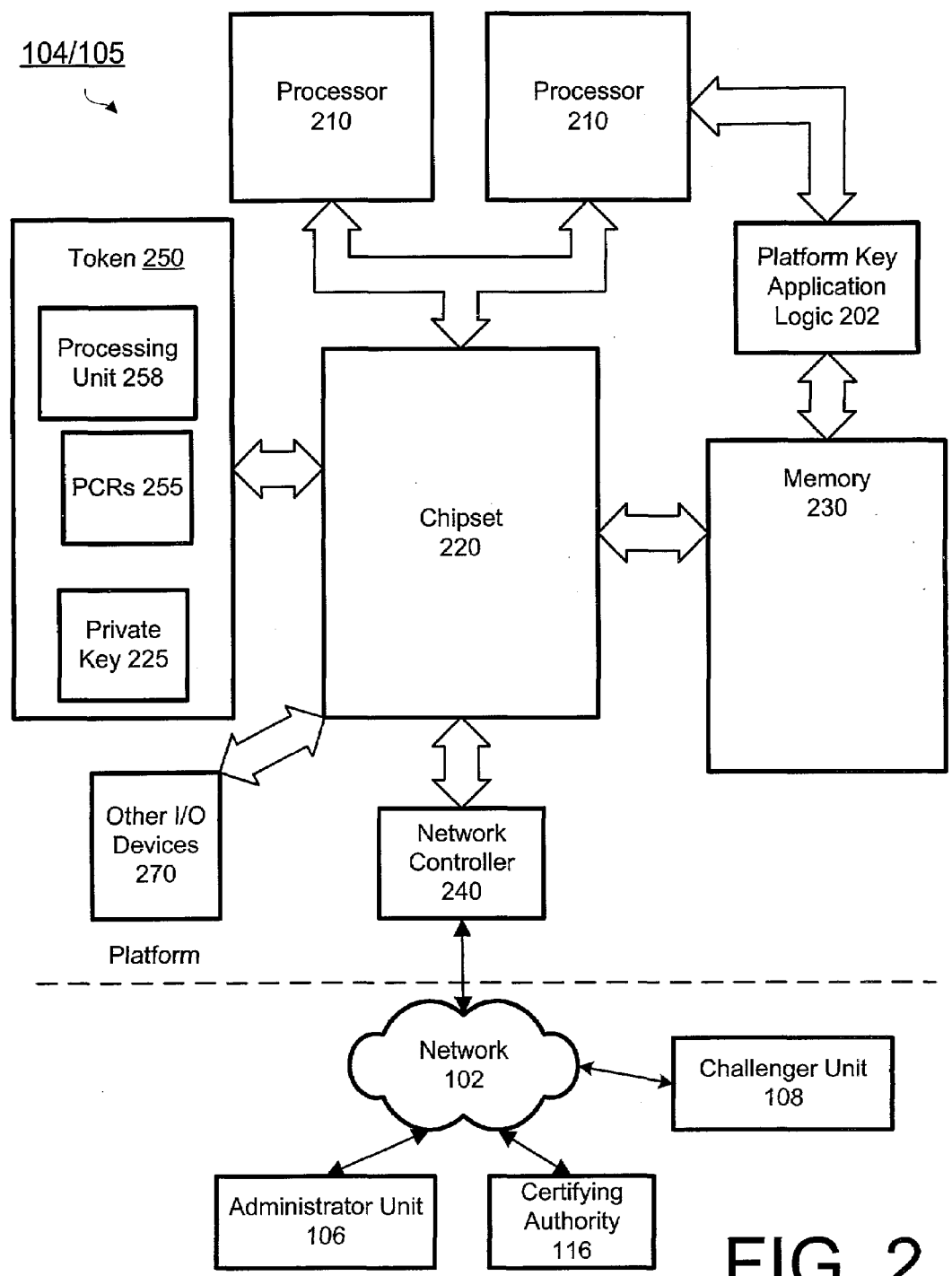
FIG. 2 illustrates a more detailed block diagram of a platform, according to embodiments of the invention.

FIG. 2 illustrates a more detailed block diagram of a platform, according to embodiments of the invention. As shown, the platform 104/105 may comprise one or more processors 210, a chip set 220, a memory 230, a platform key application logic 202, a token 250, a network controller 240 and other input/output (I/O) devices 270. Processors 110 may be coupled to the chipset 220 and to the platform key application logic 202. The memory 230 may be coupled to the platform key application logic 202 and the chipset 220.

The processors 110 may support one or more operating modes such as, for example, a real mode, a protected mode, a virtual 8086 mode, and a virtual machine mode (VMX mode). Further, the processors 110 may support one or more privilege levels or rings in each of the supported operating modes. In general, the operating modes and privilege levels of a processor 110 define the instructions available for execution and the effect of executing such instructions. More specifically, a processor 110 may be permitted to execute certain privileged instructions only if the processor 110 is in an appropriate mode and/or privilege level.

The chipset 220 may comprise one or more integrated circuit packages or chips that couple the processors 210 to the memory 230, the network controller 240, the token 250, and other I/O devices 270 of the platform 104/105 such as, for example, a mouse, keyboard, disk drive, video controller, etc. The chipset 220 may comprise a memory controller (not shown) for writing and reading data to and from the memory 230. Further, the chipset 220 and/or the processors 210 may define certain regions of the memory 230 as protected memory that may be accessed only by the processors 210 when in a particular operating mode (e.g. protected mode) and privilege level (e.g. OP).

The network controller 240 generally provides a communication mechanism for the platform 104/105 to communicate with various remote devices, such as the administrator unit 106, the certifying authority 116 and the challenger unit 108, via the network 102. For example, the network controller 240 may comprise a 10 Mega-byte (Mb) or 100 Mb Ethernet controller, a cable modem, a digital subscriber line (DSL) modem, plain old telephone service (POTS) modem, etc. to couple the platform 104 to one or more remote devices.

As illustrated in the different embodiment of the platform 104/105 in FIG. 2, the private key 225 may be stored in the token 250. However, embodiments of the invention are not so limited, as the private key 225 may be stored in a number of different locations within the platform 104/105. The private key 225 maybe stored within the chipset 220, the memory 230, the cache 112 of the processors 210 and other locations within the platform 104/105. The private key 225 may be representative of the data center private key 120 (shown in FIG. 1A) and/or the certified data center identity private keys 130 (shown in FIG. 1B). In an embodiment, the storage of the private key 225 is such that accesses thereto are limited to those operations that are considered secure.

The token 250 may comprise a processing unit 258, a number of platform configuration registers (PCRs) 255 and a private key 225. In general, the token 250 of the platform 104/105 comprises protected storage for integrity metrics, keys and secrets and may perform various integrity functions in response to requests from the processors 210 and the chipset 220. In particular, the token 250 may store integrity metrics in a trusted manner, may quote integrity metrics in a trusted manner, may seal secrets to a particular environment (current or future), and may unseal secrets to the environment to which they were sealed. Further, as will be explained later, the token 250 may include a private key 225 that identifies the platform 104/105 for validation of inclusion of the platform within the data center 140/180.

The token 250 may also be affixed to or incorporated into the platform 104/105 to provide some assurance to remote devices (e.g., the challenger unit 108) that the token 250 is associated with only one platform 104/105. For example, the token 250 may be incorporated into one of the chips of the chipset 220 and/or surface mounted to the main board of the platform 104/105. Due to the uniqueness of the fixed token 250 and its incorporation into the platform 104/105, a remote device may identify the platform 104/105 with some certainty based upon a public key associated with the private key 225. In an embodiment, the operations of the token 250 may be incorporated into other modules of the platform 104/105. For example, in one embodiment, the operations of the token 250 may be incorporated into the chipset 220, secured memory within the memory 230 (e.g., a virtual token), etc. In an embodiment, the operations of the token 250 can be incorporated into a virtual token. A virtual token and its relationship to a physical token is described in more detail in application Ser. No. 10/028,984, entitled "Connecting a Virtual Token to a Physical Token."

The PCRs 255 may be used to record and report integrity metrics in a trusted manner. The processing unit 258 may support a PCR quote operation that returns a quote or contents of one of the identified PCRs 255. In an embodiment, a PCR quote operation may be a digital signature of the value stored in the PCRs 255. The processing units 258 may also support a PCR extend operation that records a received integrity metric in an identified PCR 255. In particular, the PCR extend operation may (i) concatenate or append the received integrity metric to an integrity metric stored in the identified PCR 255 to obtain an appended integrity metric, (ii) hash the appended integrity metric to obtain an updated integrity metric that is representative of the received integrity metric and previously integrity metrics recorded by the identified PCR 255, and (iii) store the updated integrity metric in one of the PCRs 255.

As used herein, the verb "hash" and related forms refer to performing an operation upon an operand or message to produce a value or a "hash". Ideally, the hash operation generates a hash from which it is computationally infeasible to find a message with that hash and from which one cannot determine any usable information about a message with that hash. Further, the hash operation ideally generates the hash such that determining two messages which produce the same hash is computationally infeasible. While the hash operation ideally has the above properties, in practice one way functions such as, for example, the Message Digest 5 function (MD5) and the Secure Hashing Algorithm 1 (SHA-1) generate hash values from which deducing the message are difficult, computationally intensive, and/or practically infeasible.

The token 250 may be implemented in a number of different manners. However, in an example embodiment, the token 250 is implemented to comply with the specification of the Trusted Platform Module (TPM) described in detail in the Trusted Computing Platform Alliance (TCPA) Main Specification, Version 1.1a, 1 Dec. 2001.

Additionally, the platform 104/105 may comprise the platform key application logic 202. In an embodiment, the platform key application logic 202 may be a process or task that can reside within the memory 230 and/or the processors 210 and can be executed within the processors 210. Accordingly, the platform 104/105 may include a machine-readable medium on which is stored a set of instructions (i.e., software) embodying any one, or all, of the methodologies described herein. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

However, embodiments of the present invention are not so limited, as the platform key application logic 202 may be different types of hardware (such as digital logic) executing the processing described therein (which is described in more detail below). Moreover, as will be described in more detail below, the platform key application logic 202 may cause the processing unit 258 is retrieve values stored within the PCRs 255 and/or cause the processing unit 258 to sign the values stored within the PCRs 255 using the private key 225. Additionally, the platform key application logic 202 is described herein as performing a number of operations. For example, the platform key application logic 202 may cause the execution of a number of operations within the token 250. However, embodiments of the invention are not so limited. For example, in another embodiment, such operations are executed independent of the platform key application logic 202, such that the operations are performed directly within the token 205.

Further, in one embodiment, the platform 104/105 is set up such that the platform key application logic 202 is part of a secured environment within the platform 104/105. Additionally, the communications with the platform 104/105 are such that validations are performed prior to allowing accesses (including reads and writes) to portions of the memory of the platforms 104/105 that are within this secured environment. In one embodiment, these communications may be based on TCPA operations that employ the Object-Independent Authorization Protocol and/or the Object-Specific Authorization Protocol. In other embodiments, units external to the secured environment, such as the administrator unit 106, may be granted accessed to the platforms 104/105 through other forms of validations, including a public/private key exchange.

In an embodiment, this secured environment has an associated root encryption key that is used to store and retrieve data within portions of the memory that are associated with the secured environment. In one embodiment, the root encryption key is based on a permanent public key stored in the token 250 (not shown) and a digest value stored in one of the PCRs 255. In an embodiment, the root encryption key is encrypted with the permanent public key such that the digest value is stored as part of the encryption. Accordingly, this root encryption key can be used based on a decryption using this permanent public key when the stored digest value matches the digest value currently stored in the PCRs 255. Therefore, as will be described in more detail below, private keys for the data center (the data center private key 120 and the certified data center identity private key 130) may be stored and retrieved from portions of memory within the platforms 104/105 that is associated with a secured environment therein based on cryptographic operations based on the root encryption key.

Figure 3:
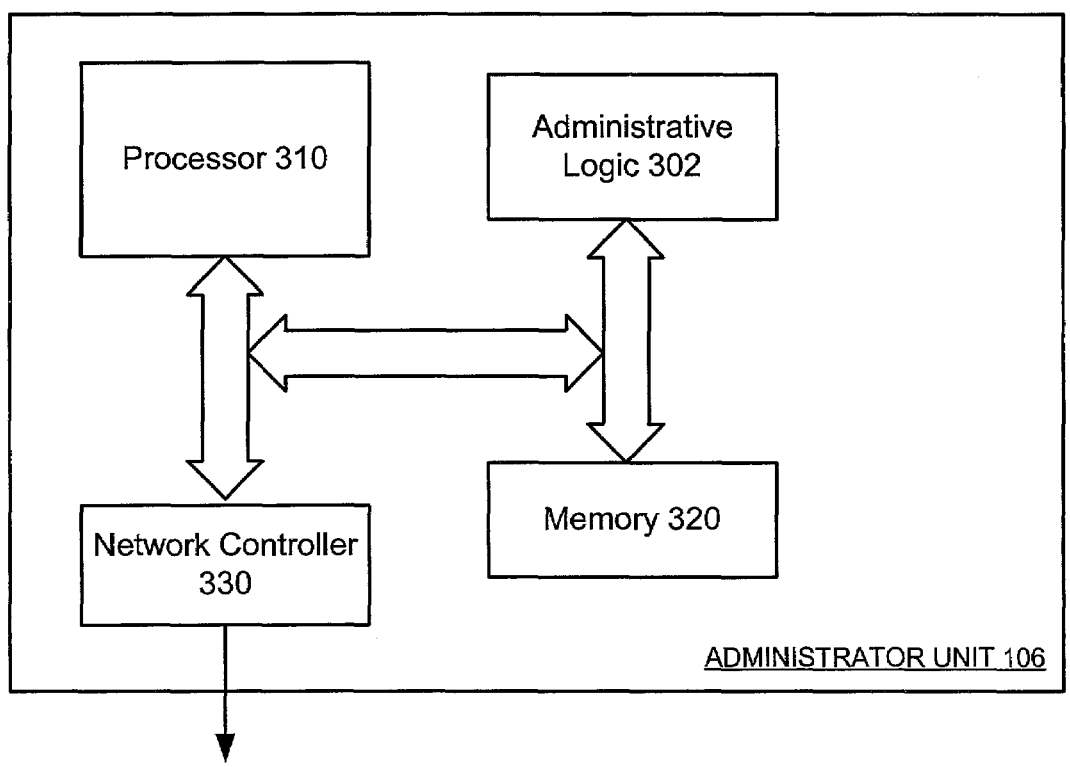
FIG. 3 illustrates a block diagram of the administrator unit 106, according to one embodiment of the invention.

FIG. 3 illustrates a block diagram of the administrator unit 106, according to one embodiment of the invention. The administrator unit 106 may comprise a processor 310, an administrative logic 302, a memory 320 and a network controller 330.

The processor 310 may be coupled to the administrative logic 302, the memory 320 and the network controller 330. The administrative logic 302 may be coupled to the network controller 330 and the memory 320. The memory 320 may be coupled to the network controller 330.

The processor 310 may comprise any suitable processor architecture and for one embodiment comprise an Intel® Architecture used, for example, in the Pentium® family of processors available from Intel® Corporation of Santa Clara, Calif. The administrator unit 106 for other embodiments may comprise more processors any of which may execute a set of instructions that are in accordance with embodiments of the present invention. The memory 320 may store data and/or instructions, for example, for the administrator unit 106 and may comprise any suitable memory, such as a dynamic random access memory (DRAM) for example.

The network controller 330 generally provides a communication mechanism for the administrator unit 106 to communicate with various remote devices, such as the platforms 104/105, the certifying authority 116, the challenger unit 108, etc. For example, the network controller 330 may comprise a 10 Mb or 100 Mb Ethernet controller, a cable modem, a digital subscriber line (DSL) modem, plain old telephone service (POTS) modem, etc. to couple the administrator unit 106 to one or more remote devices.

In an embodiment, the administrative logic 302 can be a process or task that can reside within the memory 320 and/or the processor 310 and can be executed within the processor 310. However, embodiments of the present invention are not so limited, as the administrative logic 302 can be different types of hardware (such as digital logic) executing the processing described therein (which is described in more detail below).

Accordingly, the administrator unit 106 may include a machine-readable medium on which is stored a set of instructions (i.e., software) embodying any one, or all, of the methodologies described herein. For example, software can reside, completely or at least partially, within the memory 320 and/or within the processor 310.

Figure 4:
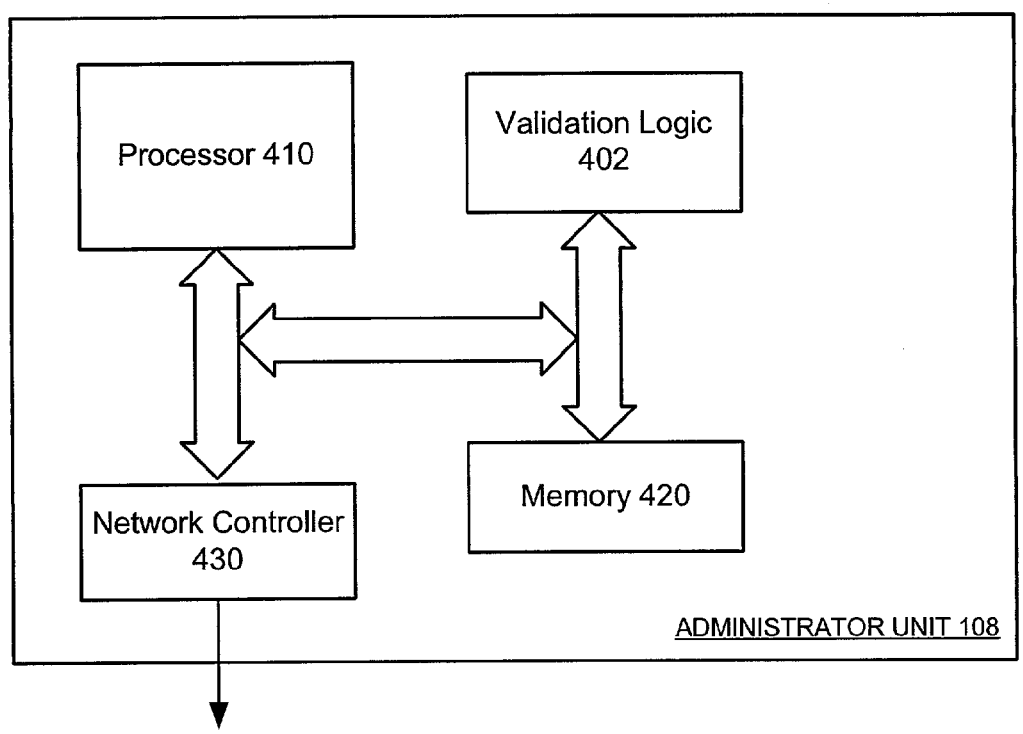
FIG. 4 illustrates a block diagram of the challenger unit 108, according to one embodiment of the invention.

FIG. 4 illustrates a block diagram of the challenger unit 108, according to one embodiment of the invention. The challenger unit 108 may comprise a processor 410, a validation logic 402, a memory 420 and a network controller 430.

The processor 410 may be coupled to the validation logic 402, the memory 420 and the network controller 430. The validation logic 402 may be coupled to the network controller 430 and the memory 420. The memory 420 may be coupled to the network controller 430.

The processor 410 may comprise any suitable processor architecture and for one embodiment comprise an Intel® Architecture used, for example, in the Pentium® family of processors available from Intel® Corporation of Santa Clara, Calif. The challenger unit 108 for other embodiments may comprise more processors any of which may execute a set of instructions that are in accordance with embodiments of the present invention. The memory 420 may store data and/or instructions, for example, for the challenger unit 108 and may comprise any suitable memory, such as a dynamic random access memory (DRAM) for example.

The network controller 430 generally provides a communication mechanism for the challenger unit 108 to communicate with various remote devices, such as the platforms 104/105, the certifying authority 116, the administrator unit 106, etc. For example, the network controller 430 may comprise a 10 Mb or 100 Mb Ethernet controller, a cable modem, a digital subscriber line (DSL) modem, plain old telephone service (POTS) modem, etc. to couple the challenger unit 108 to one or more remote devices.

In an embodiment, the validation logic 402 can be a process or task that can reside within the memory 420 and/or the processor 410 and can be executed within the processor 410. However, embodiments of the present invention are not so limited, as the validation logic 402 can be different types of hardware (such as digital logic) executing the processing described therein (which is described in more detail below).

Accordingly, the challenger unit 108 may include a machine-readable medium on which is stored a set of instructions (i.e., software) embodying any one, or all, of the methodologies described herein. For example, software can reside, completely or at least partially, within the memory 420 and/or within the processor 410.

Figure 5A:
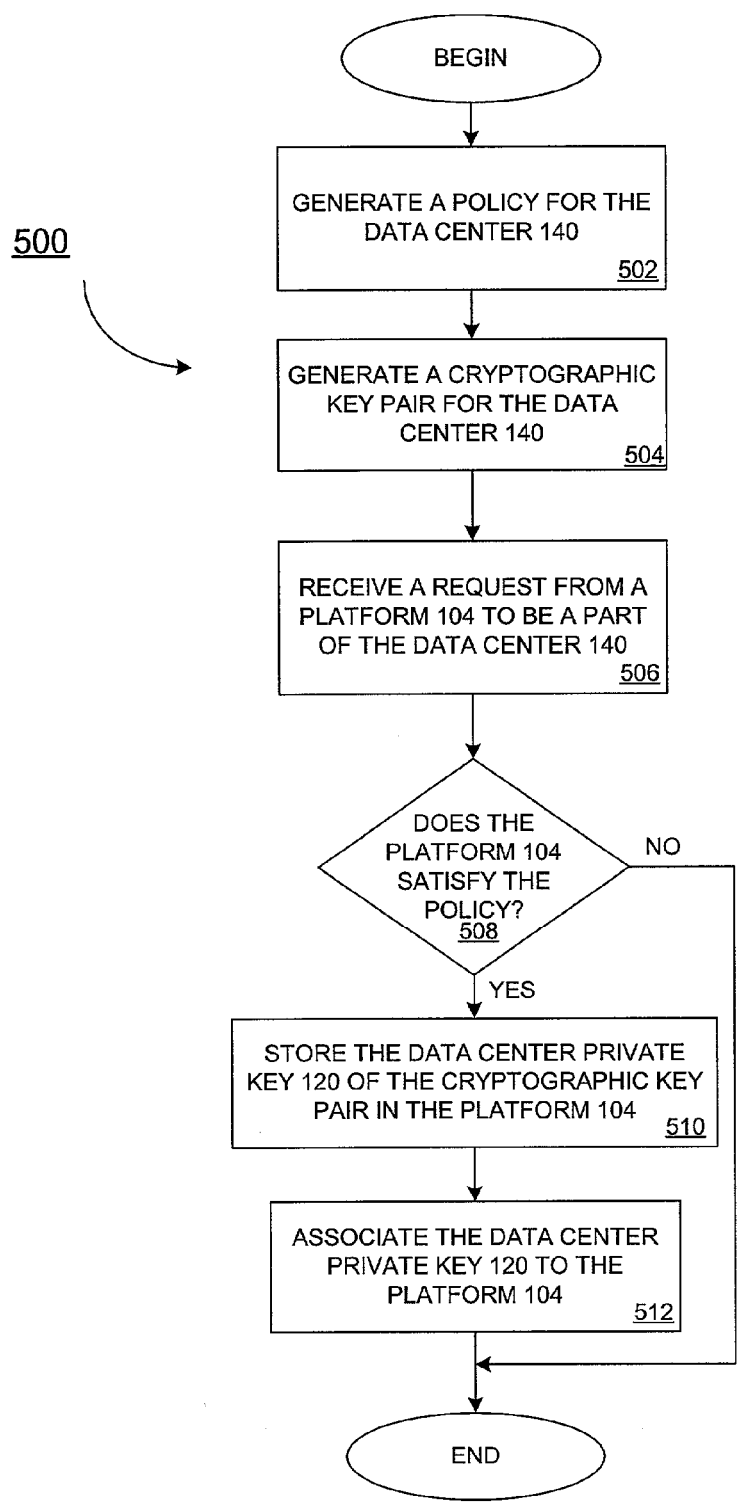
FIGS. 5A–5B illustrate flow diagrams for storage of a private key for verification of inclusion within a data center, according to embodiments of the invention.

The operations of the system 100 and the system 150 will now be described. The system 100 will be described with reference to the flow diagrams shown in FIGS. 5A, 6, 7 and 8, while the system 150 will be described with reference to the flow diagrams shown in FIGS. 5B, 6, 7 and 9. FIG. 5A illustrates a flow diagram for storage of a private key for verification of inclusion within a data center, according to one embodiment of the invention.

In block 502, the flow diagram 500 commences with a policy for the data center being generated. With reference to the embodiment illustrated in FIG. 3, the administrative logic 302 of administrator unit 106 generates the policy for the platforms to be included within the data center 140. In one embodiment, this policy may include hardware metrics for the platform 104. For example, the policy could include the requirement that a TPM module based on TCPA is within the platform 104. Other examples of a hardware metric for a policy could be the type of processor or whether the platform 104 includes different types of private or secured memory therein, such that that access to such memory is limited to those applications that are considered secure. Other examples could include the requirement of virtual machine monitoring such that portions of memory and other units within the platform 104 are limited with regard to their access. Another example of a hardware metric for a policy could be the inclusion of a cryptographic accelerator card, a network card, etc. within the platform 104.

In an embodiment, this policy may include software metrics for the platform 104. For example, the policy could include the requirement that the platform is executing a given type of operating system or other types of higher-level applications executing thereon. Examples of the higher-level applications required for a policy may include a particular type of database, the interface application for this database and cryptographic applications that may execute particular types of cryptographic operations.

The administrative logic 302 may generate this policy based on an input from an administrator of the data center. In one such embodiment, this policy may be based on requirements and criteria that users of the data center require. For example, one set of platforms allow for the retrieval of data from these platforms without communication of confidential information, while a second set of platforms allow for the e-business consumer transactions for books, toys, etc. that includes uploading of confidential/financial information, while a third set of platforms allow for the uploading of highly sensitive information including secured government documents, persons' medical records, etc. Accordingly, the requirement of policies of these different types of sets of platforms will vary based on the types of communications with these platforms.

In block 504, a cryptographic key pair for the data center is generated. With reference to the embodiment illustrated in FIG. 3, the administrative logic 302 of the administrator unit 106 generates the cryptographic key pair for the data center 140. In one embodiment, the cryptographic key pair may be an asymmetric cryptographic key pair, such as those that are based on the RSA cryptographic algorithms. In one embodiment, the administrative logic 302 generates a cryptographic key pair, such that the private key of this pair (the data center private key 120) is a same private key that is stored across the different platforms 104A–104I. Accordingly, a single cryptographic key pair is employed in the validation of the inclusion of the different platforms 104 into the data center 140. As will be described in more detail below, the data center private key 120 is stored in the platforms 104, while the corresponding public key is employed by different units, such as the challenger unit 108, in the validation of the inclusion of a platform 104 into the data center 140.

In block 506, a request is received from a platform 104 to be part of the data center 140. With reference to the embodiment illustrated in FIG. 3, the administrative logic 302 receives the request from a platform 104 to be part of the data center 140.

In block 508, the determination is made of whether the platform 104 (making the request) satisfies the policy for the data center 140. With reference to the embodiment illustrated in FIG. 3, the administrative logic 302 makes this determination regarding whether the platform 104 satisfies the policy for the data center 140. In one embodiment, the administrative logic 302 may make this determination by employing the token 250 within the platform 104. In one such embodiment, the administrative logic 302 queries the values stored in the PCRs 255. For example, particular values within the different PCRs 255 may indicate the different hardware and software metrics (such as the type of processor, operating system, etc.) for this platform 104.

In another embodiment, the administrative logic 302 may make this determination by querying other secured storage within the platform 104 (such as a private portion of the memory 230). In another embodiment, the administrative logic 302 may make this determination by querying other secured storage external to the platform 104 (such as a secured database server) that stores the policy for a number of platforms that are eligible to be included within a data center. Upon determining that the policy of the platform 104 that is requesting inclusion into the data center 140 does not satisfy the policy for the data center 140, the flow diagram 500 is complete, as the platform 104 making the request is not allowed inclusion within the data center 140. Moreover, subsequent requests by this and/or other platforms 104 can cause the operations of the flow diagram 500 beginning in block 506 when the request is received.

In block 510, upon determination that the policy of the platform 104 does satisfy the policy for the data center 140, the data center private key 120 of the cryptographic key pair is stored in the platform 104. With reference to the embodiment illustrated in FIG. 3, the administrative logic 302 stores the data center private key 120 in the platform 104. As illustrated in FIG. 2, the administrative logic 302 may store the data center private key 120 (represented as the private key 225) in a number of locations within the platform 104 (including the memory 230, the processors 210, the chipset 220, the token 250, etc.). In an embodiment, the administrative logic 302 stores the data center private key 120 within a secure location in the platform 104, using for example different encryption operations to allow access thereto.

In block 512, the data center private key 120 is associated with the platform 104. With reference to the embodiment illustrated in FIG. 3, the administrative logic 302 associates the data center private key 120 with the platform 104. In one embodiment, the administrative logic 302 may employ the token 250 when associating the data center private key 120 with the platform 104. In an embodiment wherein the token 250 is a TPM, the administrative logic 302 may employ the "bind" command (as defined within Trusted Computing Platform Alliance (TCPA) Main Specification, Version 1.1a, 1 Dec. 2001) to associate the data center private key 120 to the platform 104. The bind command associates the data center private key 120 to the platform 104, such that the data center private key 120 is only usable on the platform 104.

In an embodiment, the administrative logic 302 may employ the "seal" command (as defined within Trusted Computing Platform Alliance (TCPA) Main Specification, Version 1.1a, 1 Dec. 2001) to associate the data center private key 120 to the platform 104. Accordingly, the data center private key 120 is only revealed and thus usable when the platform is in the proper configuration. In particular, in one embodiment, the "seal" command (invoked by the administrative logic 302) incorporates the values stored in the PCRs 255 (which are indicative of the proper configuration of the platform 104) into the data that includes the data center private key 120. Therefore, during the "unseal" operation of this data that includes the data center private key 120, the token 250 compares the values of the PCRs 255 stored in this data to the current values of the PCRs 255. If these two different values match, the token 250 provides the data center private key 120 to the application/logic making the request (which is discussed in more detail below in conjunction with the challenge of the validation of the inclusion of the platform 104 into the data center 140). In one embodiment, the administrative logic 302 may perform multiple seals of the data center private key 120, wherein the data center private key 120 is sealed to different combinations of the hardware and the software configurations within the platform 104, which is described in more detail in application Ser. No. 10/082,600 entitled "Multi-Token Seal and Unseal."

In an embodiment, the administrative logic 302 may employ both the "bind" command and the "seal" command for associating the data center private key 120 to the platform 104. Accordingly, in an embodiment, the administrative logic 302 binds the data center private key 120 to the platform 104. Additionally, the administrative logic 302 may unbind the data center private key 120 and allow for the seal operation of the data center private key 120 to the platform 104.

However, embodiments of the invention are not limited to the use of the TPM/token 250 for associating the data center private key 120 to the platform 104. In another embodiment, the administrative logic 302 may employ other measurable configurations within the platform 104. For example, the administrative logic 302 may associate the data center private key 120 to the platform 104 based on the version of the processors 210 and/or their patch levels. Accordingly, the administrative logic 302 may encrypt the data center private key 120 along with the version and/or patch levels for the processors 210. Therefore, when the data center private key 120 is subsequently employed for signing data as part of a challenge of this platform 104 of its inclusion into the data center 140, the application/logic that is to retrieve this data center private key 120 compares the current versions and/or patch levels for the processor 210 to the versions and/or patch levels stored as part of the encryption of the data center private key 120.

In other embodiments, the administrative logic 302 may similarly employ hardware peripherals (such as the type of hard drive and the type of network card). Additionally, in an embodiment, the administrative logic 302 may employ the types of software executing on the platform 104 (such as the disk geometry of the hard drive, the Basic Input Output System (BIOS) settings, the type of database application, etc). Accordingly, having stored and associated the data center private key 120 in and to the platform 104, the platform 104 is now included within the data center 140.

Figure 5B:
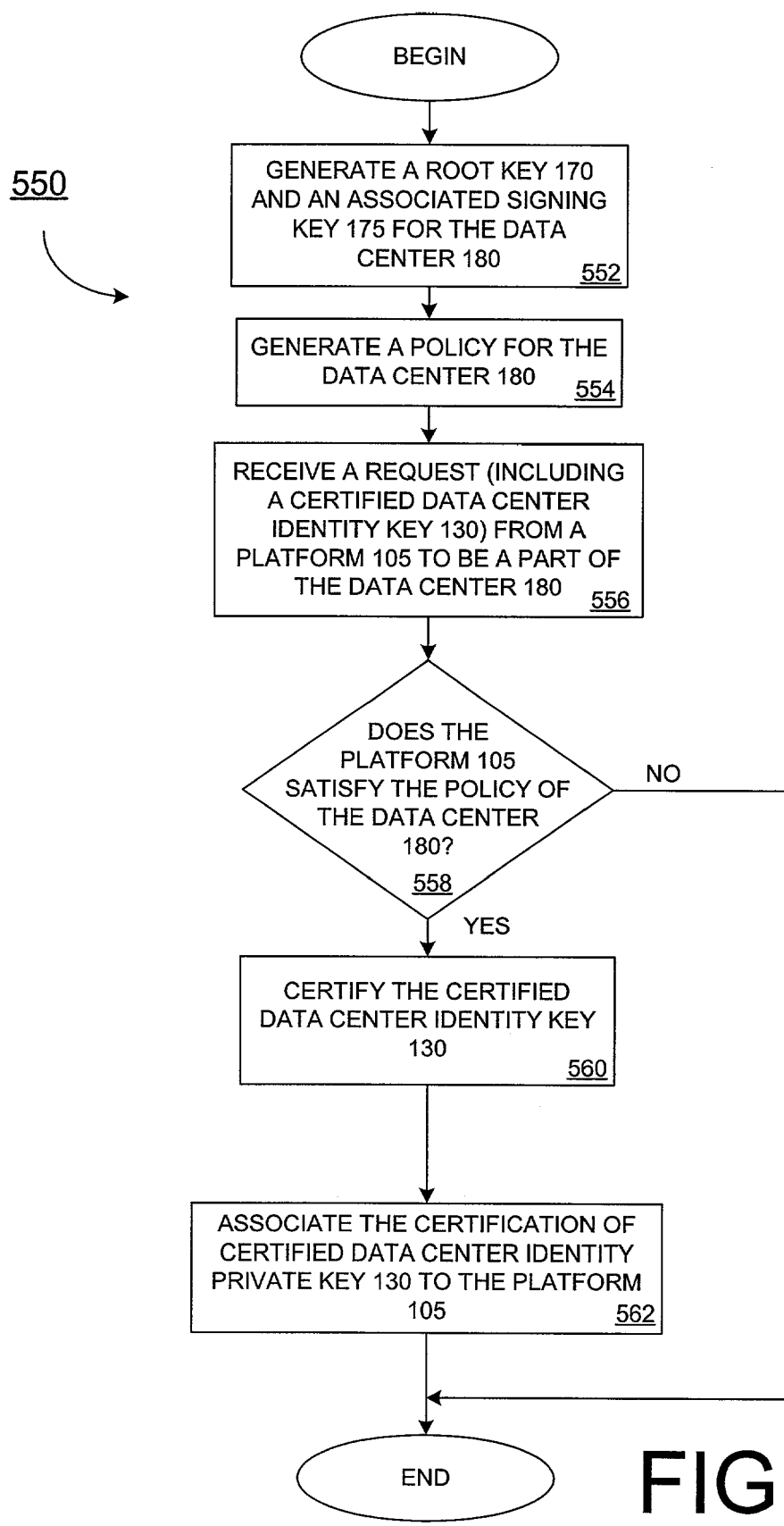

The operations of the system 150 related to the storage of a private key for verification of inclusion within a data center will now be described. In contrast to the operations of the system 100 (shown in FIG. 5A), in an embodiment, the operations of the system 150 may be such that different private keys are stored in different platforms that are part of the data center, wherein such private keys are signed by a signing key for the data center. FIG. 5B illustrates a flow diagram for storage of a private key for verification of inclusion within a data center, according to one embodiment of the invention.

In block 552, the flow diagram 550 commences with the generation of the root key 170 and the signing key 175 for the data center 180. With reference to the embodiment illustrated in FIG. 3, the administrative logic 302 generates a root key 170 for the data center 180. Additionally, the administrative logic 302 may have the certifying authority 116 to certify the root key 170, thereby generating the signing key 175. In an embodiment, the administrative logic 302 may generate the root key 170 based on a number of different types of cryptographic operations, including RSA, Diffie-Hellman, etc. Accordingly, the root key 170 is serving as a key-signing key for only the signing key 175 of the data center 180, which, as will be described in more detail below, will be more limited to attacks in comparison to the signing key 175, which is serving as a key-signing key within the data center 180 for the different private keys being stored in the different platforms 105.

In block 554, a policy for the data center 180 is generated. With reference to the embodiment illustrated in FIG. 3, the administrative logic 302 generates the policy for the platforms to be included within the data center 180. In an embodiment, the generation of the policy is similar to the generation of the policy for the data center 140 (which is described above in conjunction with the flow diagram 500 of FIG. 5). For example, the administrative logic 302 may generate a policy that is based on hardware metrics and/or software metrics of the platforms 105.

In block 556, a request from a platform 105 (that includes an certified data center identity private key 130 for this platform 105) to be a part of the data center 180 is received. With reference to the embodiment illustrated in FIG. 3, the administrative logic 302 receives this request from the platform 105. In one embodiment, the certified data center identity key 130 is a private key that has been generated by the platform 105. In an embodiment, the platform 105 may generate the certified data center identity key 130 based on TCPA operations using the token 250 (as defined within Trusted Computing Platform Alliance (TCPA) Main Specification, Version 1.1a, 1 Dec. 2001). In an embodiment, the certified data center identity private key 130 may be generated based on a number of different types of cryptographic operations, including RSA, Diffie-Hellman, etc.

In block 558, the determination is made of whether the platform 105 (making the request) satisfies the policy for the data center 180. With reference to the embodiment illustrated in FIG. 3, the administrative logic 302 makes this determination regarding whether the platform 105 satisfies the policy for the data center 180 (which is described above in conjunction with the flow diagram 500 of FIG. 5). For example, the administrative logic 302 may make this determination based on values stored within the different PCRs 255 (or other secured areas internal or external to the platform 105) that are representative of the different hardware and software metrics for this platform 105. Upon determining that the policy of the platform 105 that is requesting inclusion into the data center 180 does not satisfy the policy for the data center 180, the flow diagram 550 is complete, as the platform 105 making the request is not included within the data center 180. Moreover, subsequent requests by this and/or other platforms 105 can cause initiation of the operations of the flow diagram 550 beginning in block 556 when the request is received (wherein the request is received from a platform 105).

In block 560, upon determination that the policy of the platform 105 does satisfy the policy for the data center 180, the certified data center identity private key 130 (which is received as part of the request from platform 105) is certified. With reference to the embodiment illustrated in FIG. 3, the administrative logic 302 certifies the certified data center identity private key 130 using the signing key 175 that has been certified by the certifying authority 116.

In block 562, the certification of the certified data center identity private key 130 is associated with the platform 105. With reference to the embodiment illustrated in FIG. 3, the administrative logic 302 associates the certification of the certified data center identity private key 130 with the platform 105. In an embodiment, this certification may comprise a digital certificate that is subsequently employed by challengers of this platform 105 (e.g., the challenger unit 108) to validate the authenticity of the certified data center identity private key 130 in relation to the data center 180 (as will be described in more detail below). Similar to the association for the data center private key 120 described above, in one embodiment, the administrative logic 302 may employ the token 250 when associating the certification of the certified data center identity private key 130 with the platform 105.

In an embodiment wherein the token 250 is a TPM, the administrative logic 302 may employ the "seal" command (as defined within Trusted Computing Platform Alliance (TCPA) Main Specification, Version 1.1a, 1 Dec. 2001) to associate the certified data center identity private key 130 to the platform 105 (as described above). In one embodiment, the administrative logic 302 may perform a double seal of the certification, wherein the certification is sealed to both the hardware and the software configurations within the platform 105.

However, embodiments of the invention are not limited to the use of the TPM/token 250 for associating the certification of the certified data center identity private key 130 to the platform 105. In another embodiment, the administrative logic 302 may employ other measurable configurations within the platform 105. For example (as described above), the administrative logic 302 may associate the certification of the certified data center identity private key 130 to the platform 105 based on the version of the processors 210 and/or their patch levels. Accordingly, the administrative logic 302 may encrypt the certification of the certified data center identity private key 130 along with the version and/or patch levels for the processors 210. Therefore, when the certification of the certified data center identity private key 130 is subsequently employed for signing data as part of a challenge of this platform 105 of its inclusion into the data center 180, the application/logic that is to retrieve this data center private key 120 compares the current versions and/or patch levels for the processor 210 to the versions and/or patch levels stored as part of the encryption of the certification of the certified data center identity private key 130.

In other embodiments, the administrative logic 302 may similarly employ hardware peripherals (such as the type of hard drive and the type of network card). Additionally, in an embodiment, the administrative logic 302 may employ the types of software executing on the platform 105 (such as the disk geometry of the hard drive, the Basic Input Output System (BIOS) settings, the type of database application, etc). Accordingly, having stored and associated the certification of the certified data center identity private key 130 in and to the platform 105, the platform 105 is now included within data center 180.

Figure 6:
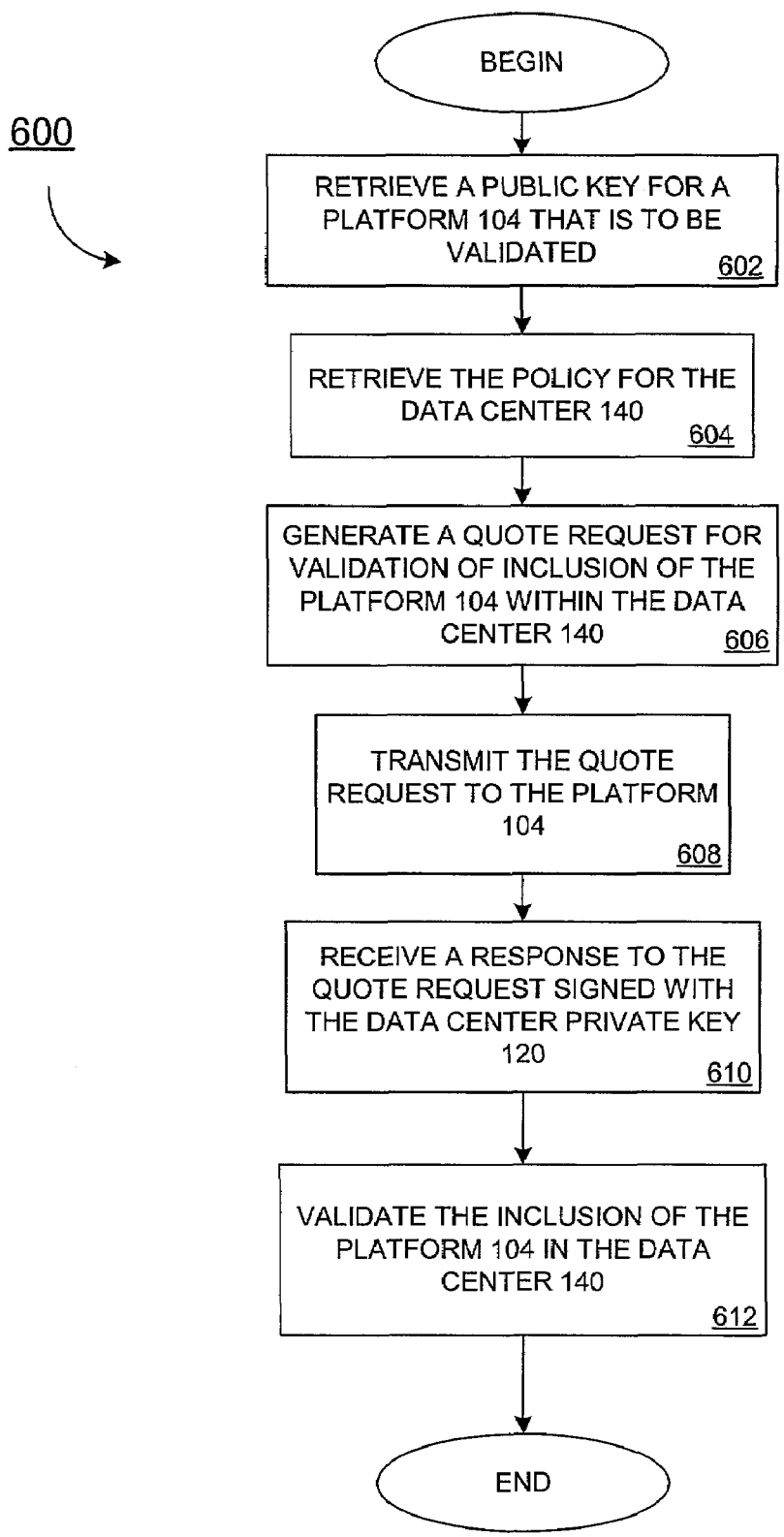
FIG. 6 illustrates a flow diagram for validating the inclusion of a platform within a data center, according to one embodiment of the invention.

The operation of challenging/validating the inclusion of a platform 104/105 within the data center 140/150 for the systems 100/150 will now be described. In particular, FIG. 6 illustrates a flow diagram for validating the inclusion of a platform within a data center, according to one embodiment of the invention. The operations illustrated in the flow diagram 600 will be described with reference to the system 100; however, such operations are applicable to the system 150.

In block 602, a public key (that is part of the cryptographic key pair that includes the data center private key 120) for the platform 104 that is to be validated is retrieved. With reference to the embodiment illustrated in FIG. 4, the validation logic 402 of challenger unit 108 retrieves the public key. In an embodiment, the validation logic 402 may retrieve the public key from the administrator unit 106. In an embodiment, the validation logic 402 may retrieve the public key from the platform 104.

In block 604, the policy for the data center 140 is retrieved. With reference to the embodiment illustrated in FIG. 4, the validation logic 402 retrieves the policy for the data center 140. In an embodiment, the validation logic 402 may retrieve the policy for the data center 140 from the administrator unit 106. In one embodiment, the validation logic 402 may retrieve the policy for the data center from the platform 104.

In block 606, a quote request is generated for the validation of the inclusion of the platform 104 in the data center 140. With reference to the embodiment illustrated in FIG. 4, the validation logic 402 generates this quote request. In an embodiment, the quote request may include a request for the value(s) stored in the PCRs 255, which are representative of the policy for the platform 104. In another embodiment, the quote request may include a request for other data or metrics that are representative of the configuration of the platform 104. For example, in an embodiment, the quote request may include the type of processor and its current patch level as well as the disk geometry of the hard drive, etc. In another embodiment, the validation logic 402 may generate a random value to be included with the quote request along with an indicator to have the platform 104 sign the random value using the data center private key 120 stored therein.

In one embodiment, the communications between the validation logic 402 and the platform 104 may be based on TCPA operations that employ the Object-Independent Authorization Protocol and/or the Object-Specific Authorization Protocol. In other embodiments, the validation logic 402 may be granted accessed to the platform 104 through other forms of validations, including a public/private key exchange.

In block 608, the quote request is transmitted to the platform 104. With reference to the embodiment illustrated in FIG. 4, the validation logic 402 transmits this quote request to the platform 104. As will be described in more detail below, this quote request may be received by the platform key application logic 202. In an embodiment wherein the values stored in the PCRs 255 of the token 250 are requested, the platform key application logic 202 may invoke TCPA operations to have the processing unit 258 retrieve the values within the PCRs 255. In another embodiment, the platform key application logic 202 may make direct queries to different components of the platform 104 (such as the processors 210) for configuration therein. Additionally (as will be described in more detail below), the platform key application logic 202 causes the response to the quote request to be signed with the data center private key 120. In an embodiment, the platform key application logic 202 may cause the processing unit 258 within the token 250 to sign the response. The platform key application logic 202 may transmit the signed response back to the challenger unit 108. In another embodiment, the quote request to the platform 104 causes the processing unit 258 to perform the above-described operations independent of the platform key application logic 202.

In block 610, the response to the quote request that is signed with the data center private key 120 is received. With reference to the embodiment illustrated in FIG. 4, the validation logic 402 receives this response to the quote request.

In block 612, the inclusion of the platform 104 in the data center 140 is validated. With reference to the embodiment illustrated in FIG. 4, the validation logic 402 validates the inclusion of the platform 104 based on the response from the quote request that was transmitted to the platform 104. In an embodiment, the validation logic 402 may validate the inclusion of the platform 104 by employing the public key that has been retrieved. In particular, the validation logic 402 may employ the public key (that corresponds to the data center private key 120 of the cryptographic key pair) to decrypt and compare the hash value within the response.

In an embodiment, the validation logic 402 may validate that the values representing the policy for the platform 104 corresponds to the policy for the data center 140. For example, in an embodiment, the values from the PCRs 255 may represent the policy within the platform 104. Accordingly, these values are included within the response to the quote request and correspond to the value representative of the policy of the data center 140 when the platform 104 is within the data center 140 and when the platform 104 is in a proper configuration. Therefore, the validation logic 402 may validate the inclusion of the platform 104 into the data center 140 by comparing these two different policies. In an embodiment wherein a random value is transmitted as part of the quote request, the validation logic 402 may also validate the response by decrypting the response using the public key (described above) and determining whether the random value that is decrypted equals the random value that was included in the quote request.

In one embodiment, the validation logic 402 may validate the inclusion of the platform 105 into the data center 180 using the certifying authority 116 to certify that the certified data center identity private key 130 has been signed by the signing key 175 that is represented of the data center 180.

In an embodiment, this validation of the inclusion of the platform 104 can be incorporated into a number of different applications. For example, in one embodiment, the validation logic 402 may be a portion of a software module that is incorporated into the communications with a server within a number of servers to verify that the given server is in a proper configuration and is part of the number of valid servers for a given web site. Accordingly, such an application provides assurance to the user of a server of a number of servers for a web site that the communications are with a properly configured server that is within the number of servers for this web site. In particular, this application can be executed for validating the inclusion of a server within a number of servers prior to other types of communications (such as e-business transactions and other confidential communications) with the server.

Figure 7:
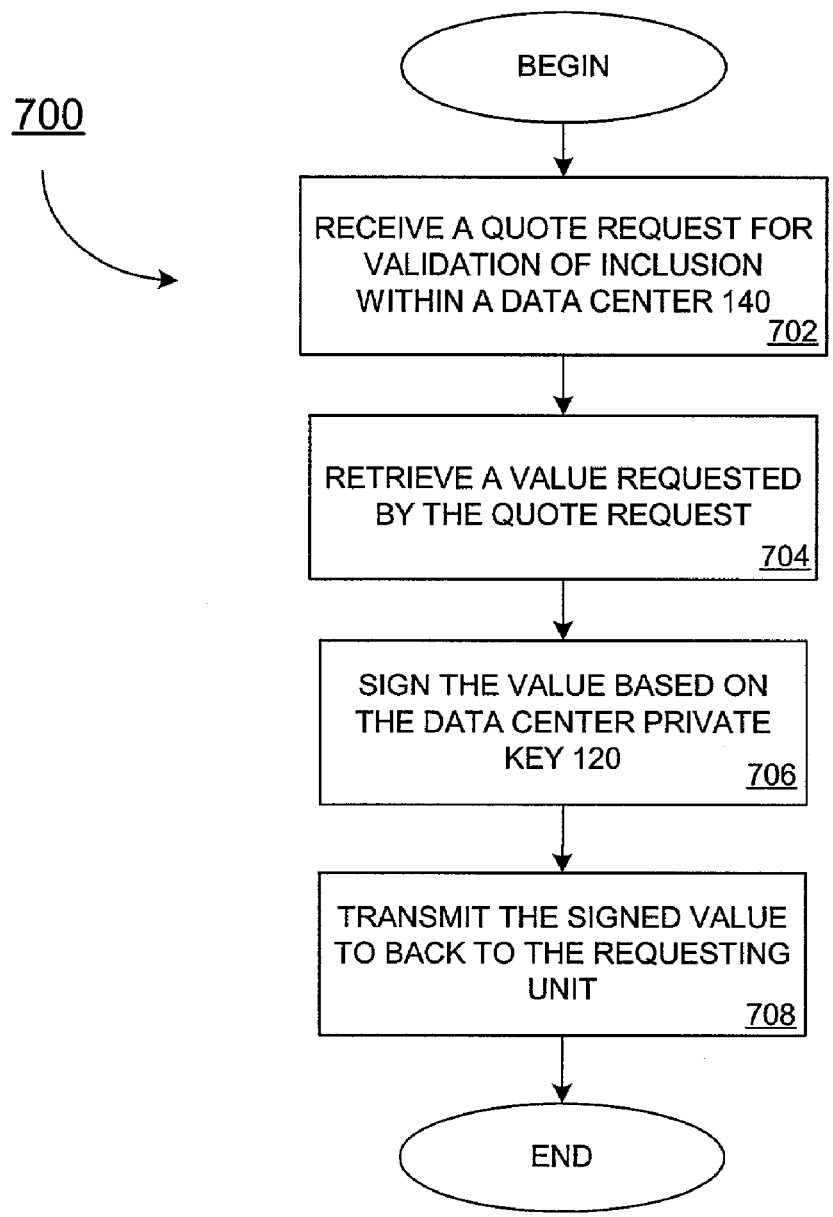
FIG. 7 illustrates a flow diagram for responding to the validation of the inclusion of a platform within a data center, according to one embodiment of the invention.

The operation of responding to the challenges/validations of the inclusion of a platform 104/105 within the data center 140/180 will now be described. In particular, FIG. 7 illustrates a flow diagram for responding to the validation of the inclusion of a platform within a data center, according to one embodiment of the invention. The operations illustrated in the flow diagram 700 will be described with reference to the system 100; however, such operations are applicable to the system 150.

In block 702, the flow diagram 700 commences with the receiving of a quote request for validation of inclusion within data center 140. With reference to the embodiments illustrated in FIG. 2, the platform key application logic 202 within the platform 104 receives the quote request for validation. As described above (depending on the configuration of the data center 140), the quote request may include different types of requests. For example, the quote request could include a request for the policy of the platform 104 (that should correspond to the policy for the data center 140 that includes this platform 104). If the platform 104 supports TCPA operations, the quote request may include a request for the values stored in the PCRs 255 of the token 250 (the TPM). As another example, the quote request could include a request for other hardware and/or software metrics (such as patch levels or versions of hardware and software units within the platform 104). Furthermore, the quote request may include a random value that is to be signed by the data center private key 120 and returned.

In block 704, a value requested by the quote request is retrieved. With reference to the embodiments illustrated in FIG. 2, the platform key application logic 202 retrieves this value. As set forth in the description of block 702, the quote request may include a request for the value stored in the PCRs 255 (that is indicative of the current policy for the platform 104). Accordingly, the platform key application logic 202 may causes the processing unit 258 of the token 250 to retrieve the values stored therein within the PCRs 255. In another embodiment wherein the quote request includes is requesting for values stored in other locations that are representative of the policy for the platform, the platform key application logic 202 can retrieve such data. In an embodiment, the value requested by the quote request may be the random number that is included within the quote request (as described above). In particular, the quote request may include a random number and an indication to sign this random number with the data center private key 120.

In block 706, the value (retrieved from within platform 104 and/or within the quote request received) is signed based on the data center private key 120. With reference to the embodiments illustrated in FIGS. 2, the platform key application logic 202 signs this value using the data center private key 120. In an embodiment, the platform key application logic 202 may cause the processing unit 258 to sign the value using the data center private key 120.

In block 708, the signed value is transmitted back to the requesting unit (e.g., the challenger unit 108). With reference to the embodiments illustrated in FIG. 2, the platform key application logic 202 may transmit the signed value as a response to the quote request using the network controller 240 via the network 102. As described above in conjunction with the flow diagram 600 of FIG. 6, the validation logic 402 within the challenger unit 108 may validate the response using the public key that corresponds to the data center private key 120, the certification associated with the private key and/or the policy for the data centers 140/180.

Figure 8:
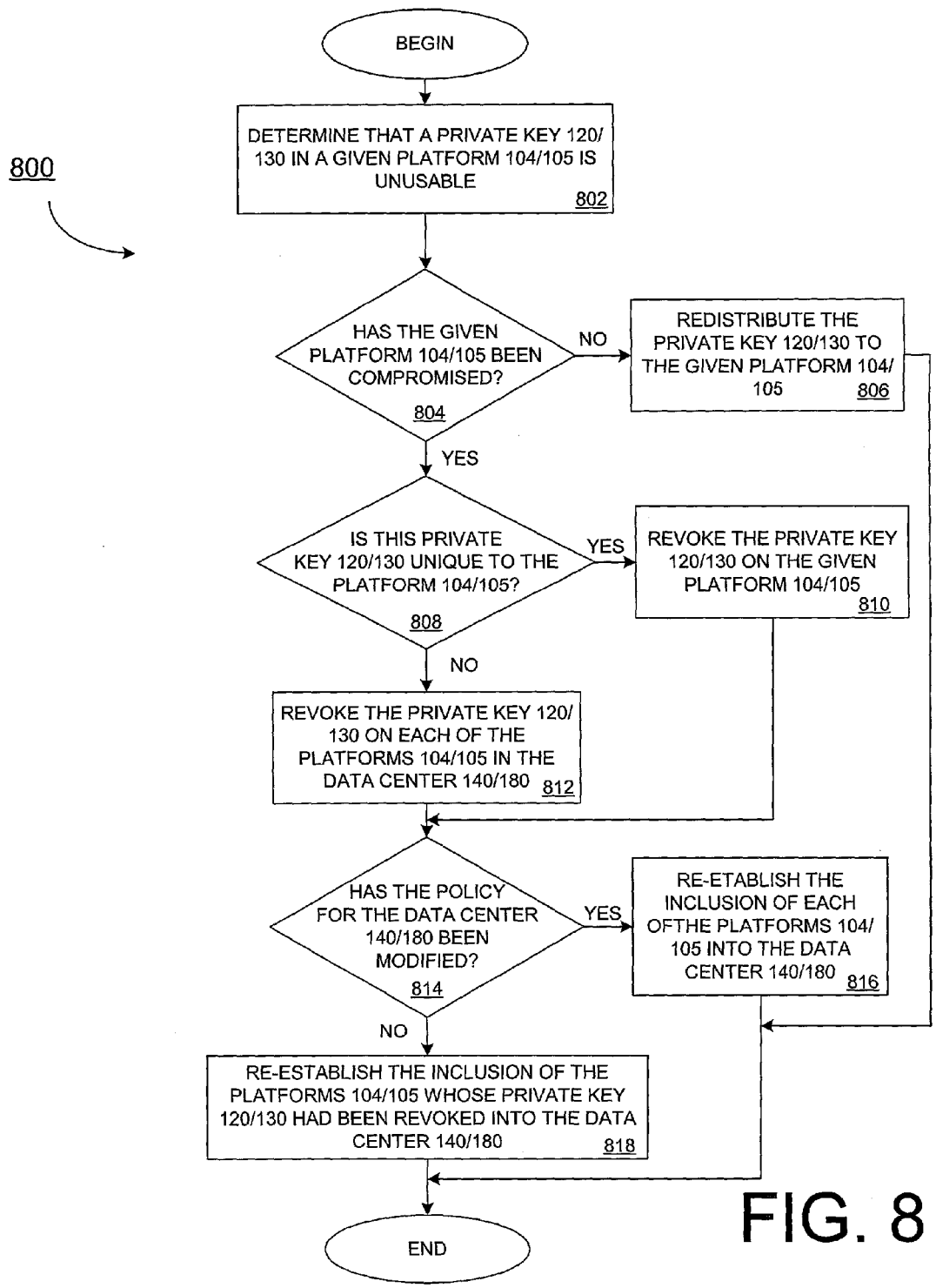
FIG. 8 illustrates a flow diagram for revoking a private key of a data center, according to one embodiment of the invention.

In an embodiment, the private keys stored in the platforms of the data center may need to be revoked due to security breaches of the platforms, corruption of the private keys, etc. The administrator unit 106 may receive an alarm or error message from the platform 104/105, the challenger unit 108 or other sources that indicates such problems with the platform 104/105 and/or the private keys 120/130. For example, the challenger unit 108 may generate an error message that is transmitted to the administrator unit 106 when the validation of one of the platforms 104/105 within the data center 140 fails. Further, the administrator unit 106 may determine such problems based on attempted communications with the platform 104/105, wherein the platform 104/105 is not communicating. FIG. 8 illustrates a flow diagram for revoking a private key of a data center, according to one embodiment of the invention.

In block 802, a determination is made that the private key 120/130 in any of the platforms 104/105 in the data center 140/180 is unusable. With reference to the embodiment illustrated in FIG. 3, the administrative logic 302 determines that the private key 120/130 is unusable. As described above, administrative logic 302 may make this determination based on communications from the challenger unit 108, the platform 104, etc.

In block 804, a decision is made on whether the given platform 104/105 that includes the private key 120/130 that is unusable has been compromised. With regard to the embodiment illustrated in FIG. 3, the administrative logic 302 determines whether the given platform 104/105 has been compromised. In an embodiment, the administrative logic 302 may determine whether the given platform 104/105 has been compromised by retrieving values stored in the PCRs 255 within the token 250, which indicate the current configuration of the platform 104/105. In another embodiment, the administrative logic 302 may determine whether the given platform 104/105 has been compromised by retrieving other types of configuration (including both hardware and software) from the platform 104/105. For example, the administrative logic 302 may query the current patch levels of various software/hardware, etc. In one embodiment, this decision is answered in the affirmative (without such determinations made by the administrative logic 302) such that the current cryptographic key pair for the data center 140/180 is revoked and a new cryptographic key pair for the data center 140/180 are redistributed (as described below).

In block 806, upon determining that the given platform 104/105 has not been compromised, the private key 120/130 is redistributed to the given platform 104/105 (that includes the private key 120/130 that is unusable). With regard to the embodiment illustrated in FIG. 3, the administrative logic 302 redistributes the private key 120/130 to the given platform 104/105. With reference to the system 100, the administrative logic 302 may redistribute the data center private key 120 to this given platform 104. With reference to the system 150, the administrative logic 302 may cause the token 150 to regenerate the certified data center identity private key 130 and to transmit this certified data center identity private key 130 back to the administrator unit 106. Accordingly, as described above, the administrative logic 302 may cause this certified data center identity private key 130 to be certified using the signing key 175 of the data center 180. In one embodiment of the system 150, the certified data center identity private key 130 may still be usable but the certification of this private key 130 is unusable. Therefore, the administrative logic 302 may cause the token 250 to retransmit the certified data center identity private key 130 back to the administrator unit 106 for re-certified (as described above). Accordingly, the operations of revocation illustrated by the flow diagram 800 are complete.

In block 808, upon determining that the given platform 104/105 has been compromised, a determination is made on whether the private key 120/130 is unique to the platform 104/105. With regard to the embodiment illustrated in FIG. 3, the administrative logic 302 makes this determination. The administrative logic 302 may make this determination based on the type of system for this given data center. For example, for the system 100, the private key 120 is not unique to the platform 104, as each of the platforms 104 of the data center 140 include a same private key 120. Conversely, for the system 150, the private key 130 is unique to the platform 105 (as described above).

In block 810, upon determining that the private key 120/130 is unique to the platform 104/105, the private key 120/130 is revoked on the given platform 104/105. With regard to the embodiment illustrated in FIG. 3, the administrative logic 302 revokes the private key 120/130 on the given platform 104/105. In one embodiment, the administrative logic 302 may revoke the private key 120/130 by transmitting revocation messages to the platform 104/105, the challenger units 108 and/or other units or modules having the private key 120/130 and/or its corresponding public key. Such a revocation message may indicate that such keys are no longer valid in relation to this data center 140/180. The operations continue in block 814 (described below).

In block 812, upon determining that the private key 120/130 is not unique to the platform 104/105, the private key 120/130 is revoked on each of the platforms 104/105 in the data center 140/180. With reference to the embodiment illustrated in FIG. 3, the administrative logic 302 revokes the private key 120/130 on each of the platforms 104/105 having stored such keys. For example, with regard to the system 100, the data center private key 120 is distributed and stored in each of the different platforms 104 within the data center 140. Accordingly, in an embodiment, the administrative logic 302 may distribute revocation messages to each of these different platforms 104 that is storing the data center private key 120 (as described above). Moreover, the administrative logic 302 may distribute revocation messages to other units or modules (such as the challenger units 108) that include the public key that corresponds to this data center private key 120 (indicating that such keys are no longer valid in relation to this data center 140).

In block 814 (whether the private key 120/130 is revoked in one or more platform 104/105), a determination is made on whether the policy for the data center 140/180 has been modified. With reference to the embodiment illustrated in FIG. 3, the administrative logic 302 makes this determination. As described above, the policy for the data center 140/180 may comprise a number of different metrics that the platforms 104/105 are to include to allow for their inclusion into the data center 140/180. Accordingly, the administrative logic 302 compares the current policy to the policy of the data center 140/180 prior to a private key 120/130 becoming unusable. In one embodiment, these different versions of the policies may be stored within the administrator unit 106. In an embodiment, a policy for the data center 140/180 are recorded periodically to allow for the tracking of changes thereto.

In block 816, upon determining that the policy for the data center 140/180 has been modified, the inclusion of each of the platforms 104/105 are reestablished into the data center 140/180. With reference to the embodiment illustrated in FIG. 3, the administrative logic 302 re-establishes the inclusion of each of the platforms 104/105. In one embodiment, the administrative logic 302 may revoke the private keys 120/130 for each of the platforms 104/105 (as described above) to re-establish their inclusion (thereby causing the platforms 104/105 to attempt to perform the operations described above related to allowing for their inclusion into the data center 140/180 in FIGS. 5A–5B).

In block 818, upon determining that the policy for the data center 140/180 has not been modified, the inclusion of the platforms 104/105, whose private key 120/130 had been revoked, are re-established into the data center 140/180. With reference to the embodiment illustrated in FIG. 3, the administrative logic 302 re-establishes the inclusion of these platforms 104/105 into the data center 140/180. This establishment of these platforms 104/105 into the data center 140/180 are described above in conjunction with FIGS. 5A–5B.

Therefore, as described, embodiments of the invention allow for the validation of the inclusion of a platform within a data center. In one embodiment, a single private key for the different platforms of the data center may be employed in the validation operations. In another embodiment, different private keys for the different platforms of the data center, which are certified by the data center, may be employed in the validation operations.

While certain exemplary embodiments have been described and shown in the accompanying drawings, it is to be understood that such embodiments are merely illustrative of and not restrictive on the broad invention, and that embodiments of this invention not be limited to the specific constructions and arrangements shown and described, since various other modifications may occur to those ordinarily skilled in the art upon studying this disclosure.

What is claimed is:

1. A platform comprising:
    a private key to validate inclusion of the platform within a data center; and
    at least one token to seal the private key to the platform.

2. The platform of claim 1, further comprising
    an interface to provide a response signed by the private key in response to a received challenge.

3. The platform of claim 1, wherein the at least one token comprises
    a register to store a metric of the platform; and
    a processing unit to seal the private key to the metric.

4. The platform of claim 3, wherein the metric stored in the register corresponds to a policy of the data center when the platform is within the data center.

5. The platform of claim 3, wherein the processing unit is to generate the metric during an initiation of the platform.

6. The platform of claim 3, wherein the processing unit is to generate the private key.

7. The platform of claim 1, wherein the private key is to be stored within a number of platforms of the data center.

8. The platform of claim 1, wherein the private key is different from private keys to be stored in other platforms of the data center.

9. A data center comprising:
    an administrative unit to generate a cryptographic key pair that includes a private key; and
    a platform coupled to the administrative unit, the platform comprising a token, wherein the token comprises
        a private key to validate inclusion of the platform within the data center;
        a register to store a metric of the platform; and
        a processing unit to seal the private key based on the metric.

10. The data center of claim 9, wherein the private key is to be stored within a number of platforms of the data center.

11. The data center of claim 9, wherein the private key is different from private keys to be stored in other platforms of the data center.

12. The data center of claim 9, wherein the register is to store a metric of the platform that corresponds to a policy of the data center.

13. The data center of claim 9, wherein the platform further comprises an interface to provide a response signed by the private key in response to a received challenge.

14. A data center comprising:
    a platform comprising
        a token that includes a processing unit and a register, the register to store a value, wherein the value represents a policy of the platform, the processing unit to generate a cryptographic key pair that includes a private key;
        a memory to store the private key of the cryptographic key pair; and
        an administrative unit coupled to the platform, the administrative unit to generate a root key for the data center, to generate a signing key for the data center based on a certification of the root key, to sign the private key of the platform with the signing key of the data center.

15. The data center of claim 14, further comprising a certification authority to certify the root key.

16. The data center of claim 15, wherein the certification authority is to validate inclusion of the platform within the data center.

17. The data center of claim 14, wherein the memory is to store the private key that is different from private keys stored in other platforms of the data center.

18. A method comprising:
    generating a cryptographic key pair associated with a data center; and
    storing a private key of the cryptographic key pair within a platform, the private key used to sign a value stored in the platform for validation of inclusion of the platform into the data center.

19. The method of claim 18, further comprising validating a policy for the platform prior to storing the private key within the platform.

20. The method of claim 19, wherein validating the policy comprises validating metrics of the platform.

21. The method of claim 19, further comprising associating the private key with the policy for the platform.

22. The method of claim 21, wherein associating the private key with the policy for the platform comprises,
    binding the private key based on the hardware of the platform; and
    sealing the private key based on the policy for the platform.

23. The method of claim 22, wherein sealing of the private key based on the policy for the platform comprises sealing the private key based on a value stored in a register within a physical token in the platform.

24. The method of claim 18, further comprising storing the private key of the cryptographic key pair in a number of platforms within the data center.

25. A method comprising:
    receiving a quote request to validate inclusion of a platform within a data center;
    retrieving a value associated with a policy of the platform, the value stored in the platform;
    signing the value using a private key of a cryptographic key pair stored in the platform; and
    outputting the signed value in response to the quote request.

26. The method of claim 25, wherein retrieving the value associated with the policy of the platform comprises retrieving the value from a physical token of the platform.

27. The method of claim 25, wherein signing the value using the private key of the cryptographic key pair comprises signing the value using a private key that is different from private keys stored other platforms within the data center.

28. The method of claim 25, wherein receiving the quote request comprises receiving a quote request that comprises a random value.

29. The method of claim 25, further comprising,
    signing the random value using the private key; and
    outputting the random value in response to the quote request.

30. A machine-readable medium that provides instructions, which when executed by a machine, cause said machine to perform operations comprising:
    generating a quote request to validate inclusion of a platform within a data center;
    transmitting the quote request to the platform;
    receiving a response to the quote request, the response including a value stored in the platform that is signed by a private key stored in the platform, wherein the value is associated with a policy of the platform; and validating the inclusion of the platform within the data center based on decryption of the value using a public key that corresponds to the private key.

31. The machine-readable medium of claim 30, further comprising retrieving a policy of the data center.

32. The machine-readable medium of claim 31, wherein validating the inclusion of the platform comprises validating that the policy of the platform corresponds to the policy of the data center.

33. The machine-readable medium of claim 31, wherein validating the inclusion of the platform within the data center comprises validating that a number of metrics of the platform correspond to the policy of the data center.

34. The machine-readable medium of claim 30, wherein validating the inclusion of the platform within the data center comprises validating the private key has been signed by a signing key associated with the data center using a certifying authority validation.

35. The machine-readable medium of claim 30, wherein generating the quote request comprises generating a quote request that includes a random value, wherein validating the inclusion of the platform within the data center comprises validating that the decryption of the response includes the random value.

36. A machine-readable medium that provides instructions, which when executed by a machine, cause said machine to perform operations comprising:
generating a root key associated with a data center;
generating a signing key based on the root key using a certification of the root key;
receiving a request from a platform for inclusion into the data center, the request to include a private key associated with the platform;
certifying the private key based on a signature from the signing key associated with the data center; and
storing the certification of the private key within the platform, the private key to sign a value stored in the platform for validation of inclusion of the platform within the data center.

37. The machine-readable medium of claim 36, wherein receiving the request from the platform comprises receiving a request that includes a private key for the platform that is different from private keys of other platforms in the data center.

38. The machine-readable medium of claim 36, further comprising validating that the platform includes a policy that corresponds to a policy for the data center prior to certifying the private key of the platform.

39. The machine-readable medium of claim 38, wherein validating comprises validating that the platform comprises a number of metrics for the data center.

40. The machine-readable medium of claim 39, further comprising associating the private key with the policy for the platform.

41. The machine-readable medium of claim 40, wherein associating the private key with the policy for the platform comprises,
binding the private key based on the hardware of the platform; and
sealing the private key based on the policy for the platform.

42. The machine-readable medium of claim 41, wherein the sealing of the private key based on the policy for the platform comprises sealing the private key based on a value stored in a register within a physical token in the platform.

43. A machine-readable medium that provides instructions, which when executed by a machine, cause said machine to perform operations comprising:
performing the following, upon determining that a platform of a number of platforms of a data center has been compromised,
revoking a current cryptographic key pair stored in the number of platforms of the data center;
generating a new cryptographic key pair associated with the data center; and
storing a new private key of the new cryptographic key pair into the number of platforms that had been compromised.

44. The machine-readable medium of claim 43, further comprising validating a policy for the number of platforms prior to storing the new private key into the number of platforms.

45. The machine-readable medium of claim 44, wherein validating the policy comprises validating metrics of the platform.

46. The machine-readable medium of claim 44, wherein the performing of the following further comprises associating the new private key with the policy of the platform.

47. The machine-readable medium of claim 43, further comprising determining that a current private key of the current cryptographic key pair is unusable in at least one platform of the number of platforms.

48. The machine-readable medium of claim 47, further comprising redistributing the current private key to the at least one platform, upon determining that the at least one platform has not been compromised.

49. A machine-readable medium that provides instructions, which when executed by a machine, cause said machine to perform operations comprising:
performing the following, upon determining that a platform of a number of platforms of a data center has been compromised and that a current private key stored in the platform is different from private keys stored in other platforms of the data center,
revoking a current cryptographic key pair that includes the current private key;
certifying a new private key based on a signature from a signing key associated with the data center; and
storing the certification of the new private key within the platform, wherein the new private key is to sign a value stored in the platform for validation of the platform within the data center.

50. The machine-readable medium of claim 49, further comprising validating that the platform includes a policy that corresponds to a policy for the data center prior to certifying the new private key.

51. The machine-readable medium of claim 50, wherein the performing the following comprises associating the new private key with the policy of the platform.

52. The machine-readable medium of claim 49, further comprising determining that the current private key is unusable in at least one of platform of the number of platforms.

53. The machine-readable medium of claim 52, further comprising redistributing the current private key to the at least one platform, upon determining that the at least one platform has not been compromised.

* * * * *

UNITED STATES PATENT AND TRADEMARK OFFICE
CERTIFICATE OF CORRECTION

PATENT NO. : 7,058,807 B2 Page 1 of 1
APPLICATION NO. : 10/122785
DATED : June 6, 2006
INVENTOR(S) : Grawrock et al.

It is certified that error appears in the above-identified patent and that said Letters Patent is hereby corrected as shown below:

In column 3, at line 49, delete "11B," and insert --1B,--.

Signed and Sealed this

Twenty-seventh Day of May, 2008

JON W. DUDAS
*Director of the United States Patent and Trademark Office*